United States Patent [19]

Dobbins et al.

[11] Patent Number: 5,684,800
[45] Date of Patent: Nov. 4, 1997

[54] METHOD FOR ESTABLISHING RESTRICTED BROADCAST GROUPS IN A SWITCHED NETWORK

[75] Inventors: Kurt Dobbins, Bedford; Phil Andlauer, Londonderry; Michael Skubisz, Durham, all of N.H.

[73] Assignee: Cabletron Systems, Inc., Rochester, N.H.

[21] Appl. No.: 559,738

[22] Filed: Nov. 15, 1995

[51] Int. Cl.$^6$ .................................. H04L 12/66
[52] U.S. Cl. .................... 370/401; 370/432; 370/469
[58] Field of Search .................... 370/60, 60.1, 94.1, 370/94.3, 85.13, 85.14, 389, 390, 396, 397, 400–404, 407, 432, 469; 340/825.52; 395/200.01, 200.02

[56] References Cited

U.S. PATENT DOCUMENTS

| | | | |
|---|---|---|---|
| 4,823,338 | 4/1989 | Chan et al. | 370/85.1 |
| 5,140,585 | 8/1992 | Tomikawa | 370/60.1 |
| 5,208,811 | 5/1993 | Kashio et al. | 370/94.1 |
| 5,394,402 | 2/1995 | Ross | 370/94.3 |
| 5,444,702 | 8/1995 | Burnett et al. | 370/94.3 |
| 5,485,455 | 1/1996 | Dobbins et al. | 370/60 |

*Primary Examiner*—Douglas W. Olms
*Assistant Examiner*—Chau T. Nguyen
*Attorney, Agent, or Firm*—Wolf, Greenfield & Sacks, P.C.

[57] ABSTRACT

Method and apparatus for establishing restricted broadcast groups in a switched network. The method assigns different virtual LAN identifiers (VLAN-IDs) to different subsets of associated end systems or access ports. Tables are maintained for mapping the VLAN-IDs with associated end systems and access ports. When a broadcast packet is received at a first switch, it is encapsulated with a VLAN header, including the VLAN-IDs, and sent out a multicast channel to all other switches in the network (domain). The original packet is sent out the other access ports of the receiving switch for the designated VLAN-IDs. The switches receiving the VLAN packet remove the header and send the original packet out access ports associated with the VLAN-IDs extracted from the header. The method provides a mechanism for forwarding broadcast packets of a protocol not supported by the switching mechanism, as well as multicast packets and unicast packets from undiscovered end systems.

17 Claims, 11 Drawing Sheets

TABLE 1: END SYSTEM/VLAN MAPPING FOR SWITCH 11

| ACCESS PORT | END SYSTEMS HEARD | VLAN ID |
|---|---|---|
| 1 | 20A | VLAN 100 |
| 2 | 20B | VLAN 100 |
|   |     | VLAN 20 |
| 3 | 20C | VLAN 20 |
| . | .   | . |
| . | .   | . |
| . | .   | . |

FIG. 6

TABLE 2: VLAN/ACCESS PORT MAPPING FOR SWITCH 11

| VLAN ID | ACCESS PORT |
|---|---|
| VLAN 100 | 1 |
|          | 2 |
| VLAN 20  | 2 |
|          | 3 |
| .        | . |
| .        | . |
| .        | . |

FIG. 7

VLAN PACKET

METHOD FOR ESTABLISHING RESTRICTED BROADCAST GROUPS IN A SWITCHED NETWORK

FIELD OF THE INVENTION

This invention relates to packet switched data communications networks, and more particularly to an apparatus and method for establishing restricted broadcast groups known as virtual LANs (VLANs) which provide a simple but robust mechanism that allows broadcast and/or multicast packets to be "flooded" through a switched domain and transmitted only to those users or ports defined for a particular VLAN.

RELATED APPLICATIONS

The subject matter of the above application may be advantageously combined with the subject matters of the following copending and commonly owned applications, which are hereby incorporated by reference in their entirety:

U.S. Ser. No. 08/188,238 entitled "Network Having Secure Fast Packet Switching And Guaranteed Quality of Service," filed Jan. 28, 1994 by Kurt Dobbins et al., now U.S. Pat. No. 5,485,455; and U.S. Ser. No. 08/187,856 entitled "Distributed Chassis Agent For Network Management," filed Jan. 28, 1994 by Brendan Fee et al., now U.S. Pat. No. 5,522,042.

BACKGROUND OF THE INVENTION

Most data communications networks today rely heavily on shared medium, packet-based LAN technologies for both access and backbone connections. These networks use bridges and routers to connect multiple LANs into global internets. An internet router must be capable of processing packets based on many different protocols, such as IP, IPX, DECNET, AppleTALK, OSI, SNA and others. The complexities of building networks capable of routing packets on the global internet using different protocols is a challenge for both vendors and users.

In U.S. Ser. No. 08/188,238 to Dobbins (see related applications above), there is described a new secure fast packet switching (SFPS) technology which provides the same or better reliability and security as routers, but with much greater performance and without an increase in cost. The SFPS system avoids the complexities and costs of providing multi-protocol routers. Also, the SFPS system provides capabilities which routers do not, such as the ability to create separate logical work group LANs on the same physical network and the ability to guarantee a quality of service (QOS) by providing dedicated switched paths through the network.

SFPS provides high performance packet switching based on physical layer addresses such as source and destination MAC IDs—the unique medium access control (MAC) address assigned to each end system by the IEEE. End-to-end connections are determined by a network management application that provides security and best path routing determinations based on a number of constraints. By switching packets based only on MAC layer information, network infrastructure remains protocol insensitive.

More specifically, SFPS uses source and destination MAC addresses which alone, or in combination with an input port on a switch, form a unique "connection identifier" for any communication exchange between designated end systems. As an example:

input port=2
source MAC address=00:00:1D:01:02:03
destination MAC address=00:00:1D:11:22:33 together form a "tuple" bound to a specific uni-directional flow from a source address to a destination address. All packets that have this tuple are automatically switched according to the operation of the SFPS.

Network infrastructures are built around a core switching fabric, which provides the physical paths or routes that allow users to send information to one another. Access to the switching fabric is gained through an access port. Access ports provide several functions—most importantly, they provide security and accounting services. End systems such as personal computers (PCs), workstations and servers connect to an access port using one or more access technologies such as Ethernet, Token Ring, FDDI, or ATM.

In traditional bridge and router devices, each packet is treated as an independent unit of data which is individually processed by application of access and security constraints, as well as path determination. In contrast, with SFPS this processing is done only on initial probe packets which are decoded, and through use of a central directory of end system constraints policy, call attributes, location, paths, quality of service, etc., the connection is either rejected or accepted. If accepted, the path is determined and switches along the path are "programmed" to allow subsequent packets on this "connection" to be switched. In either case, subsequent datagrams are either switched or discarded without having to reapply all of the security and access control and path determination logic.

The SFPS switching technology may be constructed as: software objects which exist in embedded devices as firmware; software objects which are part of an application on a commercial computer system; application specific integrated circuits (ASIC); or functionally equivalent hardware components.

It is common for internetworking devices to "route" the protocols that a device supports, and "bridge" the protocols that are not supported for routing. In addition, some protocol frames (such as DECs LAT) are actually unroutable. In SFPS switches, there are protocol-specific call processors to route protocol-specific broadcast frames (note that unicast frames can be processed by a "generic" call processor that does not decode or translate the frame at all, but instead makes the connection request based on the source and destination unicast MAC addresses in the frame). However, a problem arises in that an SFPS switch has nothing equivalent to bridging of multicast and broadcast packets for non-supported protocols. Thus, until a protocol-specific call processor is implemented in a switch, the switch must discard any broadcast or multicast frames it does not understand.

SUMMARY OF THE INVENTION

A method and apparatus are provided for establishing restricted broadcast groups within a switching fabric, known as virtual LANs (VLANs). The VLANs provide a simple but robust mechanism for allowing broadcast and multicast packets to be "flooded" through the switching fabric and transmitted only to those users or ports defined for a particular VLAN.

More specifically, the switched network includes a plurality of end systems and switches connected by links. The switches have access ports connected to end systems and network ports connected to other switches. Each end system has a unique physical layer address, e.g., MAC address. In accordance with this invention, different virtual LAN identifiers (known as VLAN-IDs) are assigned to different subsets of associated end systems or access ports. Each access switch maintains a first table for mapping VLAN-IDs to associated end systems and/or access ports (the End System/VLAN table). Each access switch also maintains a second table for mapping access ports (of associated end systems) to associated VLAN-IDs (the VLAN/Access Port table).

According to a first embodiment, the restricted V-LAN flooding is used for broadcast packets of a protocol not supported by the switches. When an original broadcast packet (of an unsupported protocol) is received by a first access switch from a first end system, the first switch determines and adds a VLAN header to the original data packet to create a VLAN packet. The VLAN header includes designated VLAN-IDs from the first table. The designated VLAN-IDs are assigned based on the physical source address of the first end system. The first access switch then forwards the VLAN packet to all other switches on a multicast channel of point-to-point connections between the switches. The first switch also forwards the original broadcast packet out the access ports identified in the second table for the designated VLANS (except the originating port).

The other switches receive the VLAN packet and extract the designated VLAN-IDs from the VLAN header and then forward the original packet out the access ports, defined in the other switch's second table, for the designated VLAN-IDs.

Other embodiments include the designation of a default VLAN-ID which maps to all access ports, a reserved VLAN-ID for use with multicast packets, and restricted flooding for packets directed to an undiscovered end system. Still another embodiment provides a single or distributed network server on the multicast channel (between switches) to handle broadcast and multicast packets, which embodiment scales better for larger networks.

More specific methods and a particular apparatus for implementing the present invention are described in the following detailed description and drawings.

BRIEF DESCRIPTION OF THE DRAWINGS

FIG. 4-1 and 4-2 is a flowchart showing processing of a data packet by an SFPS switch.

DETAILED DESCRIPTION

The SFPS Network—Switching of Unicast Packet With Generic Call Processor and Switching of Protocol-Supported Broadcast Packets According to one embodiment, the establishment of VLANs for transmitting broadcast/multicast packets of non-supported protocols is intended for use in the SFPS switched network described in U.S. Ser. No. 08/188,238. The following is a general description of the operation of switching "unicast" packets on that network, as illustrated in FIGS. 1–4.

Figure 1:
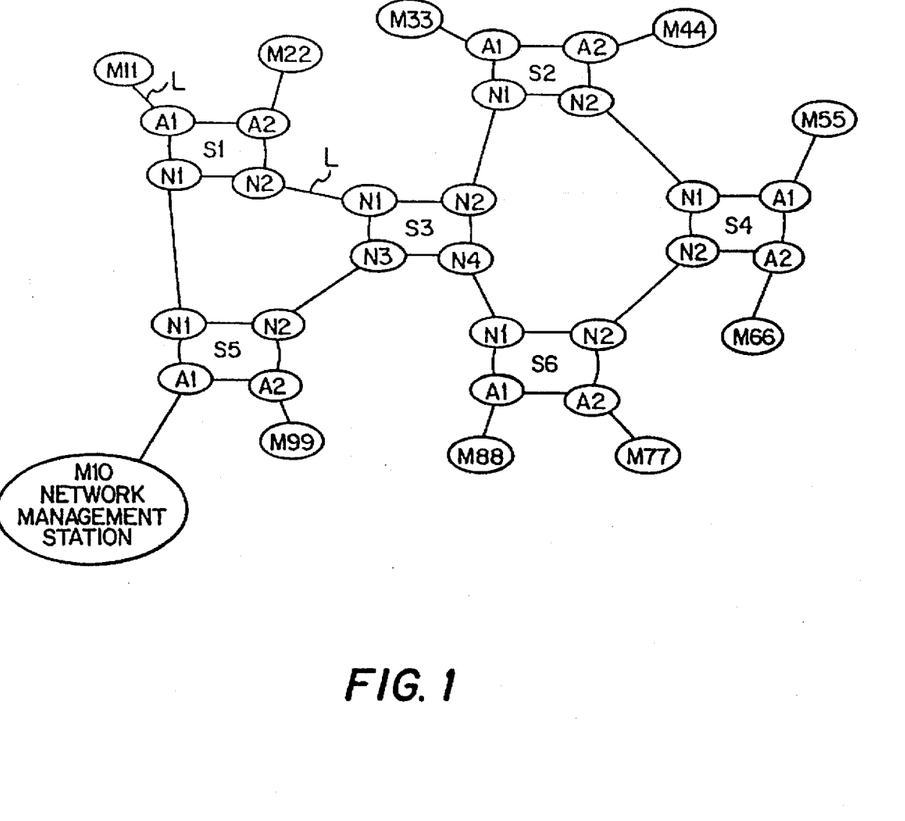
FIG. 1 is a schematic illustration of a network topology built with SFPS switches.

FIG. 1 shows a representative network topology built with six secure fast packet switches (SFPS) labeled S1–S6 connected by links L. Each switch has for example four ports; some ports are labeled A for access and some are labeled N for network. The end systems are connected to the access ports by links L and are labeled "$M_{13}$". One end system is a network management station or server (NMS) M10, which includes a connection server.

Figure 2:
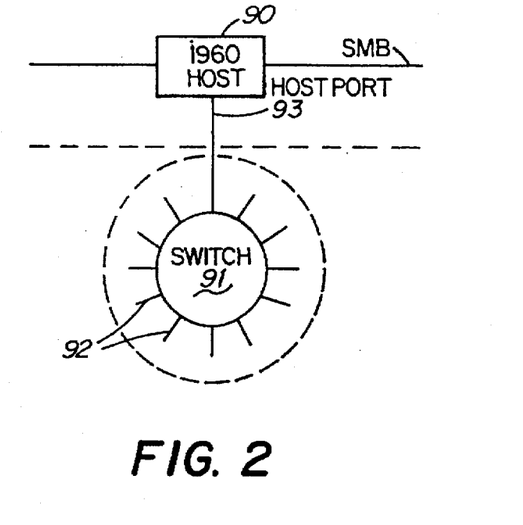
FIG. 2 is a schematic illustration of an SFPS switch.

FIG. 2 is a schematic illustration of an SFPS switch 91 having a plurality of ports 92. A host port 93 connects the switch to its host CPU 90, which may be an i960 microprocessor sold by Intel Corporation. The host CPU is connected to a system management bus (SMB) for receipt and transmission of discovery and other control messages.

Figure 3:
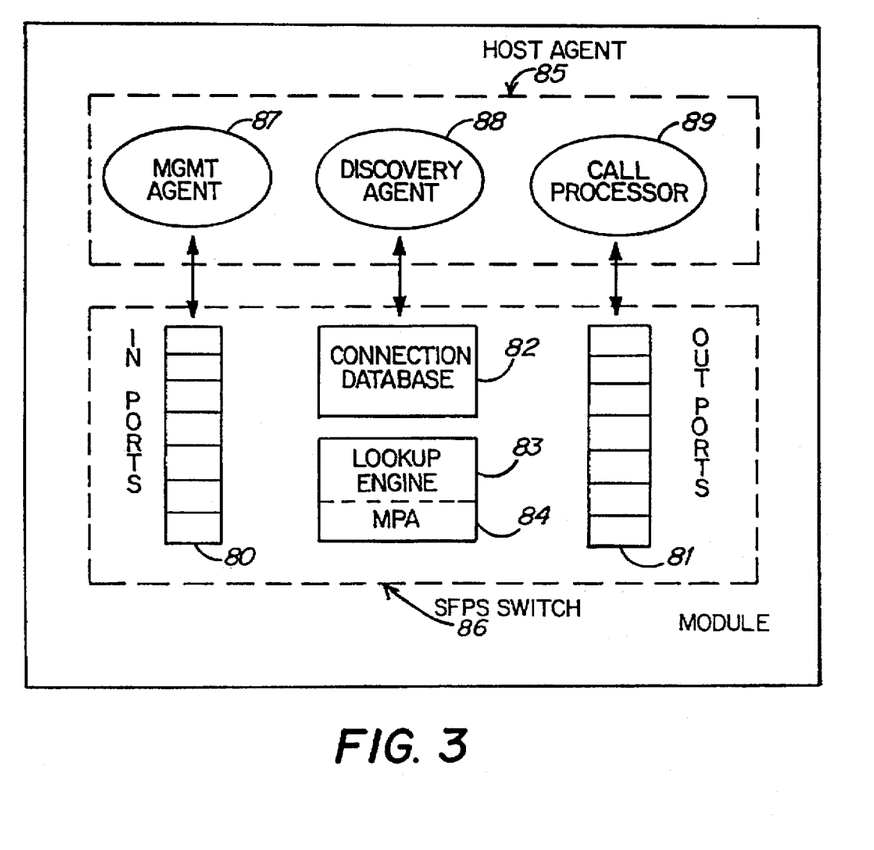
FIG. 3 is a logical view of an SFPS switch.

FIG. 3 illustrates the internal operation of the switch. The SFPS switch 86 includes in ports 80, out ports 81, a connection database 82, a look-up engine 83, and a multi-level programmable arbiter MPA 84. The switch 86 sends and receives messages from the host agent 85, which includes a management agent 87, a discovery agent 88, and a call processing agent 89.

The management agent 87 provides external control of the configuration and operation of the SFPS switch, through the network management system.

The discovery agent 88 provides a mapping of end systems to switching ports through a passive listening (snooping) capability and a registering of end system addresses and port locations of the host switch with a common external directory. Adjacent switches are also discovered and mapped, but this may be done with an explicit switch-to-switch protocol (nonpassive).

The call processor 89 provides a means for requesting connections to be established between two end systems. Unicast frames are handled by a "generic" call processor which programs the switches based on the source and destination MAC addresses. In a case where the source and destination MAC addresses are not in the packet frame, i.e., usually in a frame that has a broadcast—all hosts—MAC address, a "protocol-specific" call processor (if available) will decode the packet to find source or destination network addresses and use these to map back to the physical addresses via the external directory. Once the end system MAC addresses are known, the protocol-specific call processor will then request the connection between the end systems. If the broadcast frame was a probe or address resolution packet (i.e., an implied connection request), the call processor will return a probe reply as a "proxy" which gives the destination end system MAC addresses. Subsequently, the source end system can then send packets directly to the destination based on its MAC address.

FIG. 4 is a flow chart illustrating what happens from the time a data packet is received on an in port of the switch, until it is sent on the correct out port.

Referring to FIG. 4-1, in step 300 the host CPU 90 is initialized. The host programs the connection database 82 to send any "unknown" or "broadcast" connections to the host port (step 301). The switch then waits for a packet to arrive (step 302). Once a packet has arrived (step 303), the switch extracts the source MAC address, destination MAC address, and identifies the inbound port on which the packet was received (step 304). The look-up engine 83 checks to see whether this source-destination pair is already located in the connection database 82 (step 305). If it is not found, the packet is given to the host agent 85 (step 308). The call processor and the host agent determine whether it is a broadcast destination (step 309). If the answer is yes, a protocol-specific call processor (if available) decodes the packet to find the network protocol source and destination addresses (steps 310–311). A different protocol decode logic would be provided for each network protocol. For example, in the IP protocol, if an ARP request is received, the call processor would get the target IP address (step 312). It would then ask the external directory for the MAC address of the destination IP (step 313). In the next step 314, the directory sends the MAC destination address back to the call processor. The call processor 89 then asks the connection server (SCS) to set up a connection between the source MAC and destination MAC (step 315). The call processor 89 forms an ARP reply packet by putting the destination MAC address inside the packet (step 316), and the call processor sends a reply to the source address (step 317). It should be noted that this reply allows the source end system to update its private mapping of the destination IP address to a nonbroadcast MAC address. All subsequent packets to this destination IP address will be properly framed with the source and destination MAC address for which connections will now exist.

Note that if no call processor exists which supports the relevant protocol, the broadcast packet is dropped (step 321). The present invention is a method of handling such packets.

If the packet is not a broadcast packet, it is given to the "generic" call processor (treated as an unknown SA-DA connection—step 318), which asks the connection server to set up a connection and forward the packet (step 319); the call processor then discards the packet (step 320).

Returning to step 305, if the source and destination MAC pair are found in the connection database 82, the data packet is sent to the switch outport(s) 81 defined in the database (step 306). In next step 307, the management agent 87 collects statistics regarding transmissions through the switch and sends them to the SCS (connection server).

Figure 5:
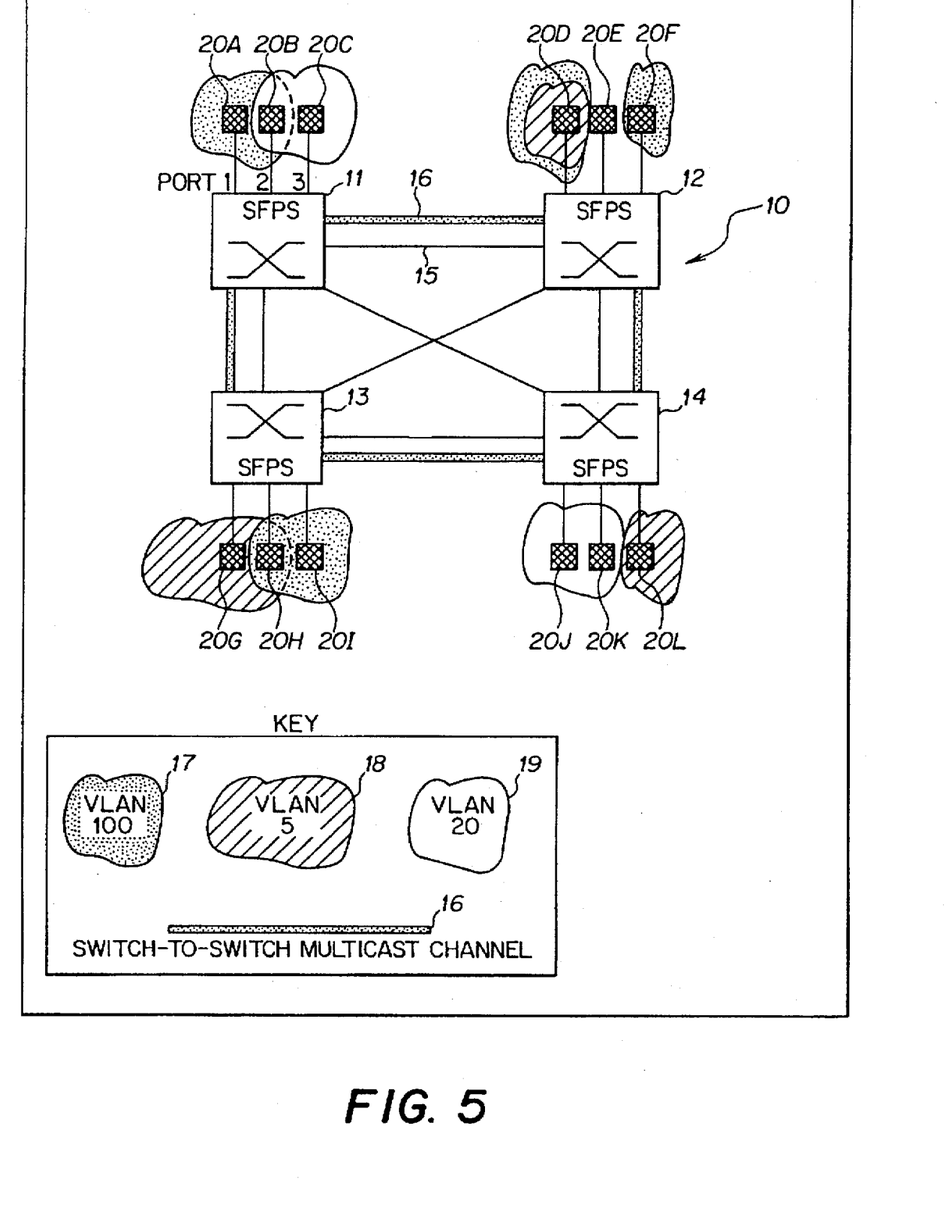
FIG. 5 is a schematic illustration of a network topology including three virtual networks (VLAN 100, VLAN 5, and VLAN 20) according to the present invention.

Restricted Broadcast Groups For Non-Supported Broadcast, MultiCast and Unknown Unicast Packets FIG. 5 illustrates generally a logical view of the present invention for establishing restricted broadcast groups or virtual LANs (VLANs) within a switched network. The representative network 10 has four SFPS switches 11–14, all of the switches being connected by physical links forming point-to-point connections 15, and which physical connections together form a logical multicast channel 16. The multicast channel 16 connects the network ports of all switches. A plurality of end systems 20A–20L extend from access ports on the various switches 11–14. The end systems are shown grouped into different subsets known as virtual LANs 17, 18 and 19, which are given VLAN identifiers VLAN 100, VLAN 5, and VLAN 20, respectively. As shown in FIG. 5, "VLAN 20" includes end systems 20B, 20C, 20J and 20K. "VLAN 5" includes end systems 20D, 20G, 20H and 20L. "VLAN 100" includes end systems 20A, 20B, 20D, 20F, 20H and 20I.

During a discovery time, as each switch 11–14 is discovered, it is put in a point-to-point connection that connects all SFPS switches. This forms the multicast channel 16 which all switches use between themselves.

Also during the discovery time, each switch 11–14 discovers its associated end systems (i.e., switch 11 discovers end systems 20A, 20B, 20C) and enters these end systems in a common directory which assigns VLAN-IDs to the end systems. The directory returns a mapping of VLAN-IDs and associated end systems, which mapping each switch uses to build two internal tables: a first table that lists the VLAN-ID for each end system (the End System/VLAN Table—see FIG. 6), and a second table that defines a port mask for each VLAN-ID (the VLAN/Access Port Table—see FIG. 7).

During real time operation of the system, a first switch (for example switch 11) receives a broadcast or multicast packet that it cannot process with a protocol-specific call processor. The switch will encapsulate the original packet and insert a VLAN header containing a list of VLAN-IDs for the source end system (see FIG. 8), before flooding the encapsulated (VLAN) packet out the multicast channel 16 to all other switches. For example, if first switch 11 receives a broadcast packet from first end system 20B, switch 11 returns from its end system table (FIG. 6) that VLAN 100 and VLAN 20 are associated with source end system 20B. First switch 11 will insert VLAN 100 and VLAN 20 into the VLAN header (FIG. 8). In addition, first switch 11 determines the port masks for VLAN 100 and VLAN 20 from its port table (FIG. 7), and then sends the original broadcast packet out all access ports of the first switch in VLAN 100 or VLAN 20 (except for the source port 2); in this case, the original packet is sent out access port 1, which connects to end system 20A, also in VLAN 100, and out access port 3, which connects to end system 20C, also in VLAN 20.

As each of switches 12, 13 and 14 receive the VLAN packet on multicast channel 16, they strip off the encapsulated VLAN header and look up in their respective VLAN/Access Port table for any associate mapping to VLAN 100 and VLAN 20. Switch 12 determines in its port table that it has associated access ports to end systems 20D and 20F designated for VLAN 100. Similarly, switch 13 determines from its port table that it has associated access ports to end systems 20H and 20I for VLAN 100. Switch 14 determines from its port table that it has associated access ports to end systems 20J and 20K for VLAN 20. The original packet is thus transmitted out the access ports to end systems 20D, 20F, 20H, 20I, 20J and 20K.

The following describes the changes and additional functionality required of the SFPS access switches to support the establishment of VLANs for multicast and broadcast packets. Switches with only network ports continue to function as described in prior U.S. Ser. No. 08/188,238 to Dobbins et al.

The Switch-To-Switch Multicast Channel

Each SFPS switch supports the multicast channel 16 by having a connection in each switch that connects it to all other switches in the network (or within a subsection of the network, such as a domain). This is in essence a point-to-multipoint connection in each switch. It should be noted that this multipoint connection is only between the switches themselves, which scales better than having a multipoint connection between all users (end systems).

A connection server (i.e., M10 in FIG. 1), which includes a common directory of all switches, has the responsibility to program the multicast channel connection each time a new switch joins or leaves the topology, i.e., such a change may be detected by neighbor advertisement signals sent by the switches.

Figure 6:
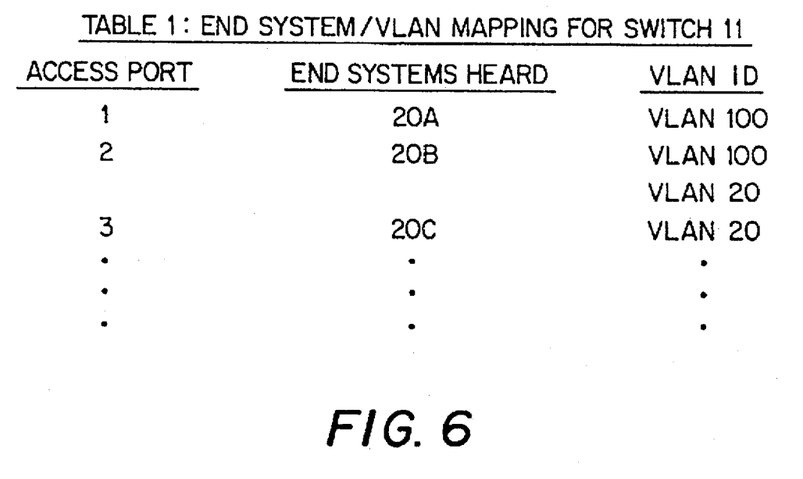
FIG. 6 shows an end system table for mapping VLAN-IDs to associated end systems.

The End System/VLAN Table (FIG. 6)

Each switch that has an access port maintains a table of end systems heard on each access port, and a list of VLANs to which each end system belongs. An end system can belong to more than one VLAN at any given time.

The assignment of VLAN-IDs may be accomplished in several ways. First, the VLAN-IDs may be maintained by a common directory. For example, as each end system is discovered by an access switch, it is registered with a common directory of end systems for the entire network, and the directory then returns a list of VLAN-IDs to the access switch with the "End System Discovery Message ACK." Alternatively, a management application may administratively assign the VLAN-IDs, and manage the end system and port tables in the switch. As a further alternative, an access switch may send a Resolve signal to a directory, which directory then returns a mapping of VLAN-IDs for an associated end system.

Figure 7:
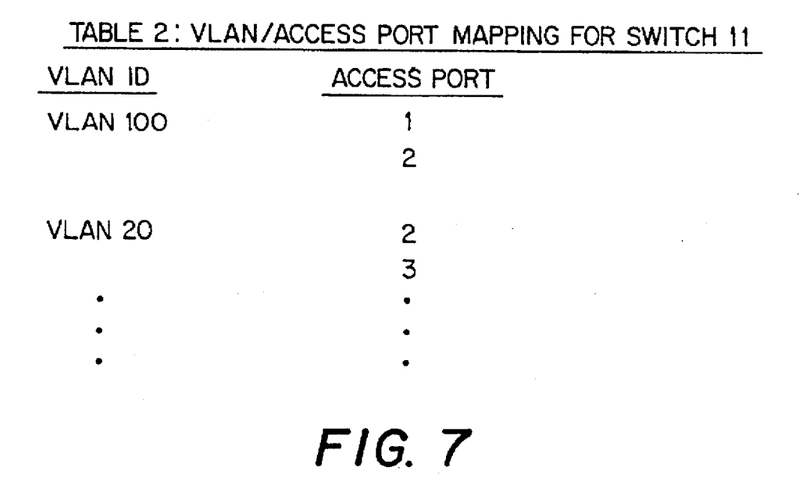
FIG. 7 shows a port table for mapping access ports (of associated end systems) to associated VLAN-IDs.
Figure 8:
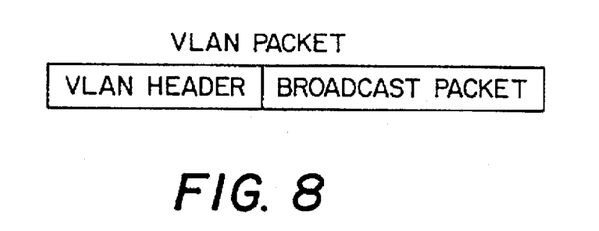
FIG. 8 shows one embodiment of a VLAN packet, in which a VLAN header is appended to an original data packet.

The VLAN/Access Port Table (FIG. 7)

Each switch having an access port maintains a port table which maps VLANs to associated access ports. This table may be filled in dynamically through the implicit mapping of VLANs to end systems. Each time a VLAN is mapped to an end system, it is automatically inserted in a port-mapping entry for the source port on which the end system is located. Ports, like end systems, can belong to more than one VLAN at any given time; the port's VLAN mapping strictly depends upon the VLAN of the end systems on it. The out ports for each VLAN entry in the table essentially define the flood mask for the access ports.

The Default VLAN-ID

Figure 9:
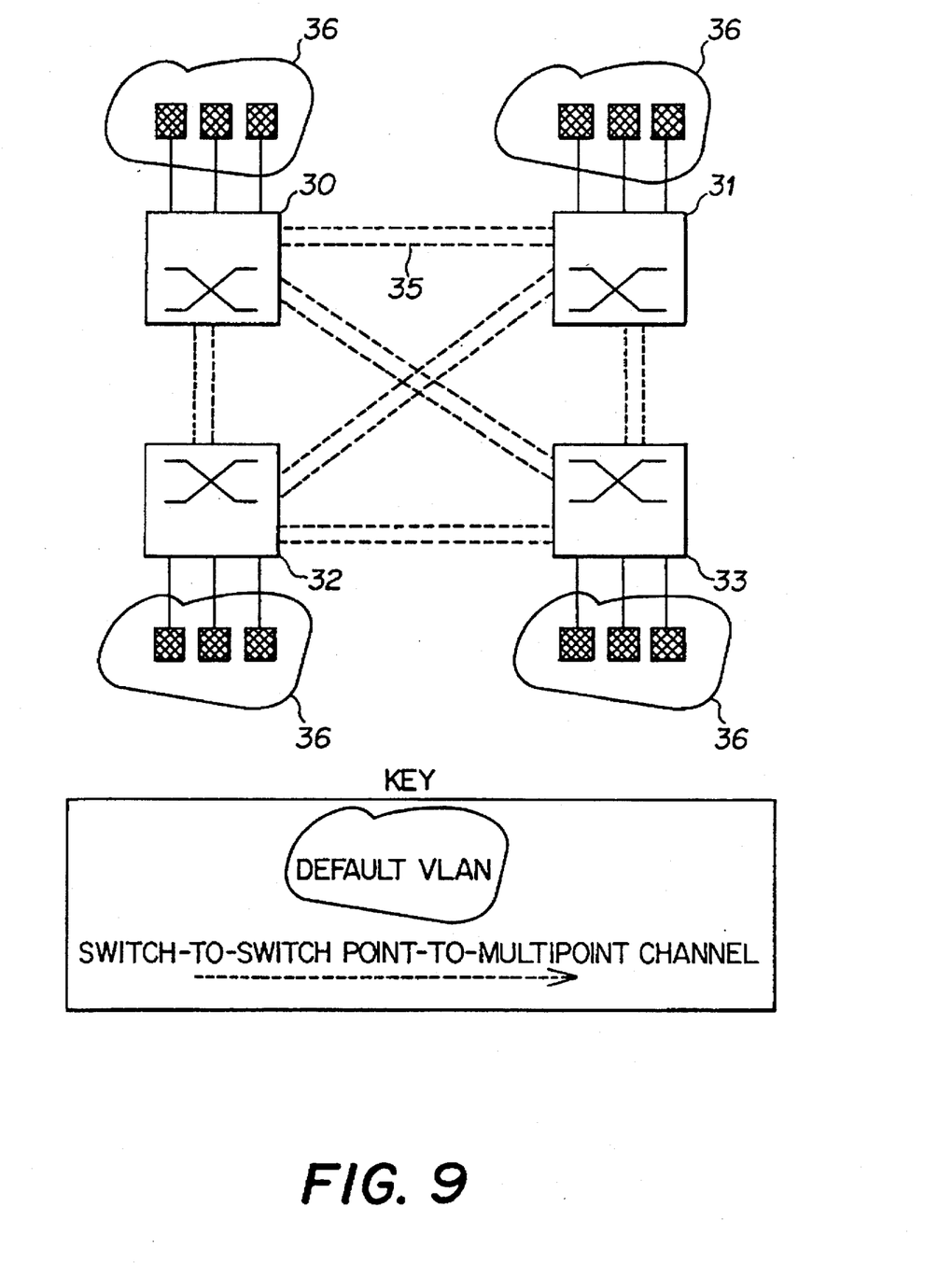
FIG. 9 is a schematic illustration of a network topology utilizing a default VLAN according to the present invention.

A default VLAN-ID (VLAN-ID=1) may be used to map an end system to a VLAN when no VLAN-ID had been administratively assigned. The default VLAN is a special case which maps to all access ports. This allows flooding out all ports when no VLAN is defined. For example, FIG. 9 illustrates a network of four switches 30, 31, 32, 33, connected by multicast channel 35, prior to assignment of any specific VLAN-IDs such that all end systems fall within a default VLAN 36.

The VLAN Call Processor

The VLAN call processor is essentially a default call processor for broadcast/multicast packets for which no protocol-specific call processor exists. For example, an ARP call processor would be able to decode an ARP broadcast message.

The VLAN call processor would take any packet it receives and then encapsulate the broadcast/multicast packet in a header, the header containing a list of VLAN-IDs on which the packet belongs. The VLAN-ID list may be determined by using the source MAC address of the original packet and doing a look-up in the end system table. In this example, VLAN-IDs are determined based on the source rather than the destination. Once this encapsulated packet is formed, it is then forwarded on the multicast channel to all other switches. The original packet would also be given to the local forwarder.

The Local Forwarder

Each switch has a process that listens on the multicast channel 16. This process is responsible for processing any encapsulated frames (VLAN packets) sent from other switches. When the VLAN packet is received, it is stripped of its VLAN-ID list in the header. For every entry in the VLAN-ID list, the local port table is searched for a matching entry. The local forwarder then forwards the original data packet out any ports that are mapped to the VLAN-ID. If the VLAN-ID is the default VLAN-ID (=1), then the original packet is flooded out all access ports on the switch. If no VLAN-IDs match, then the packet is discarded.

The Central Connection Server And Common Directory

A central connection server programs the point-to-multipoint connections between all of the SFPS switches, as there is no provision in each switch to do so (see M10 in FIG. 1). Thus, any time the connection server "discovers" a change in a switched topology, it has to reprogram the multicast channel between the switches.

The server accesses a common directory for mapping end systems to VLAN-IDs. A management application may provide this on the front end, and in addition provide for changes to the mapping in the directory itself and in any switches that have been informed of the mapping. Any end system not defined with a VLAN would default to VLAN-1.

If the VLAN assignment is done inside an End System Discovery Message ACK, then a new TLV list is added to the message. This functions similar to an "alias" field in which more than one are allowed since multiple VLANs could be returned. If the VLAN assignment is done with Resolve messages, then only a new TAG type has to be assigned since the message supports returning multiple resolutions. The semantics would be "resolve this end system to its VLAN-IDs." If the assignment was done completely out of band, then no signalling changes would be required.

Reserved VLAN-IDs

In the previous embodiment, broadcast and multicast packets are propagated through the switches based on the VLAN-IDs to which the source belongs. In some cases, mostly with multicast frames, it may be desirable to map a VLAN to the destination, e.g., OSPF packets.

This may be accomplished by allowing the switches to support "well-known" VLANs without any run-time assignment. If a switch receives a packet destined for a reserved VLAN, it would encapsulate it and set the VLAN list without mapping it to the end system table. The packet would then be forwarded out the multicast channel and any switches supporting the reserved VLAN (or having heard a reserved VLAN-type packet), would flood the original packet out.

Unicast Flooding

VLANs may be supported for unicast frames, for example if a call processor has not yet discovered the end system. This works similar to the broadcast/multicast operation except that instead of mapping the outports at each flooding switch, each switch would look up the destination unicast address in the end system table and send the original packet out the port on which the end system belongs.

VBUS Service

Figure 10:
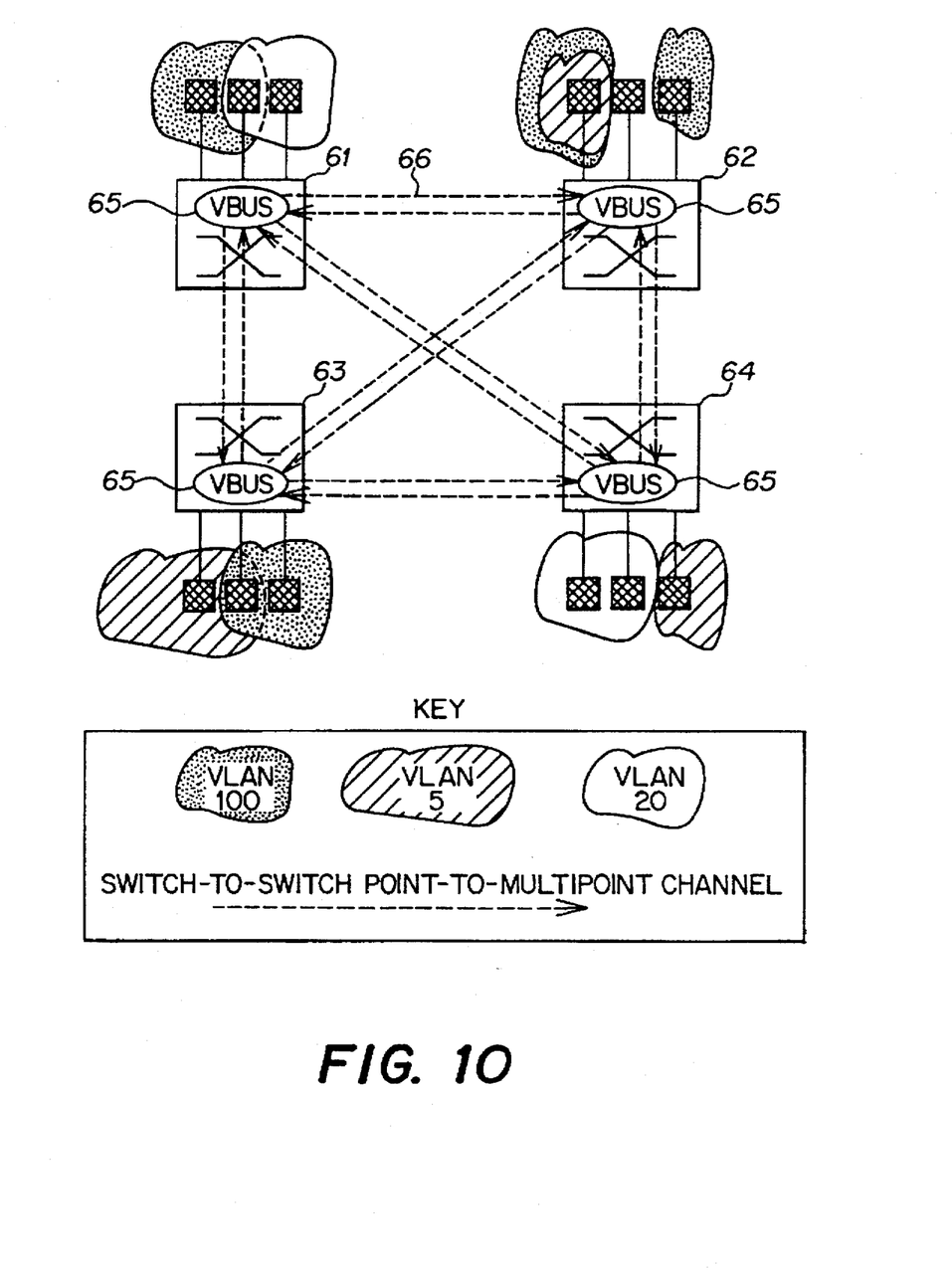
FIG. 10 is a schematic illustration of a network topology utilizing a distributed VBUS server according to an alternative embodiment of the present invention.

Since point-to-point connections between switches does not scale well, in an alternative embodiment each switch has a connection to a single (or distributed) server in the network which will forward broadcast and multicast packets. This service, referred to as the Virtual Broadcast/Unknown Service (VBUS), is distributed into all SFPS switches in a first implementation as illustrated in FIG. 10. Switches 61, 62, 63, 64 are connected by multicast channel 66, and each switch includes the distributed VBUS service 65.

Figure 11:
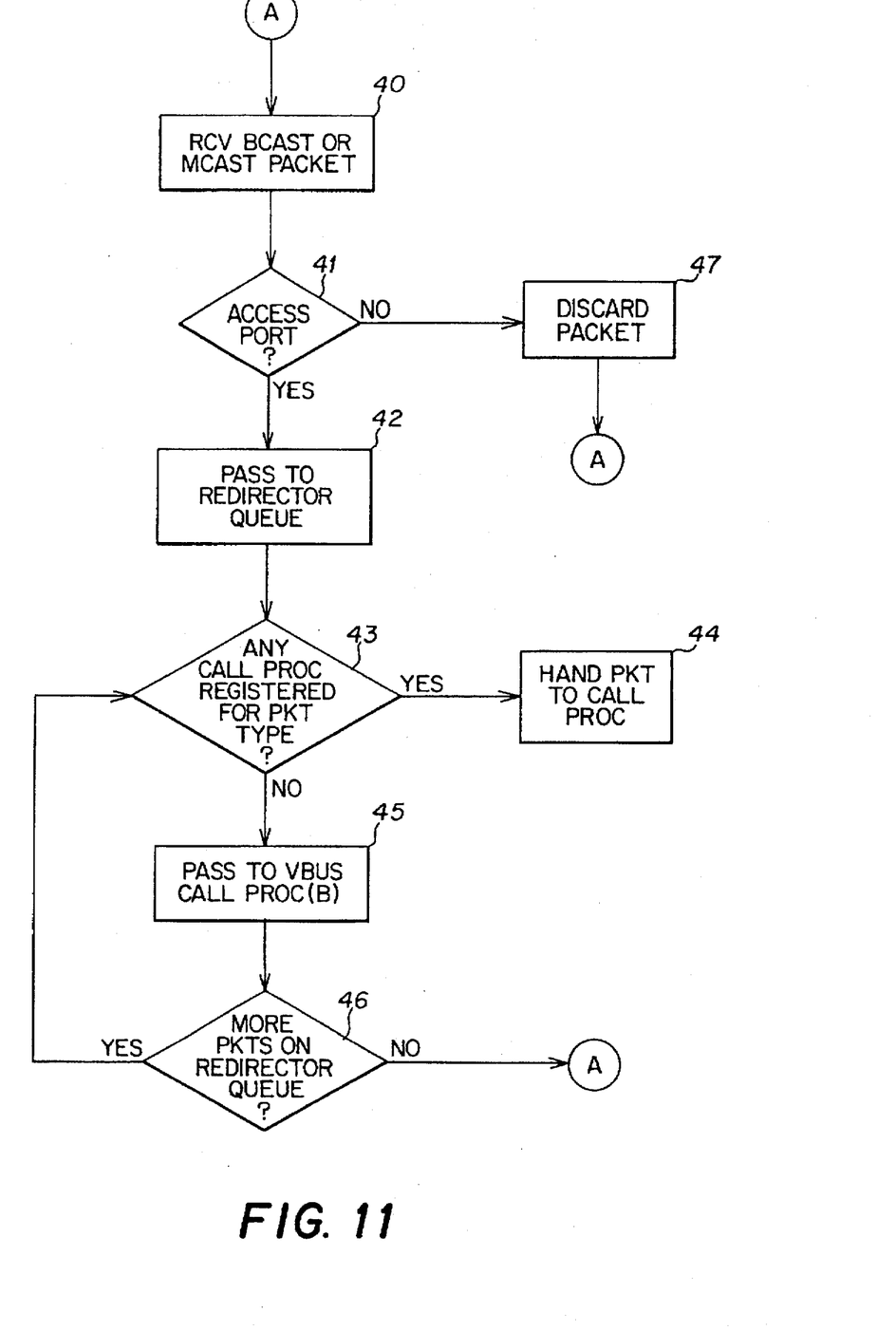
FIG. 11 is a flow chart showing the redirected flow of a broadcast or multicast packet to the VBUS service.

FIG. 11 illustrates the redirected flow of data packets for the VBUS service. When a first switch receives a broadcast or multicast packet (step 40), it first determines whether the packet was received on an access port (step 41). If no, the packet is discarded (step 47). If yes, the packet is passed to a redirector queue (step 42), and if a call processor supports the packet type (step 43), the redirector delivers the packet to the protocol-specific call processor (step 44). If not, the packet is passed to the VBUS call processor (step 45). The redirector queue then handles the next packet on the queue (step 46).

Figure 12:
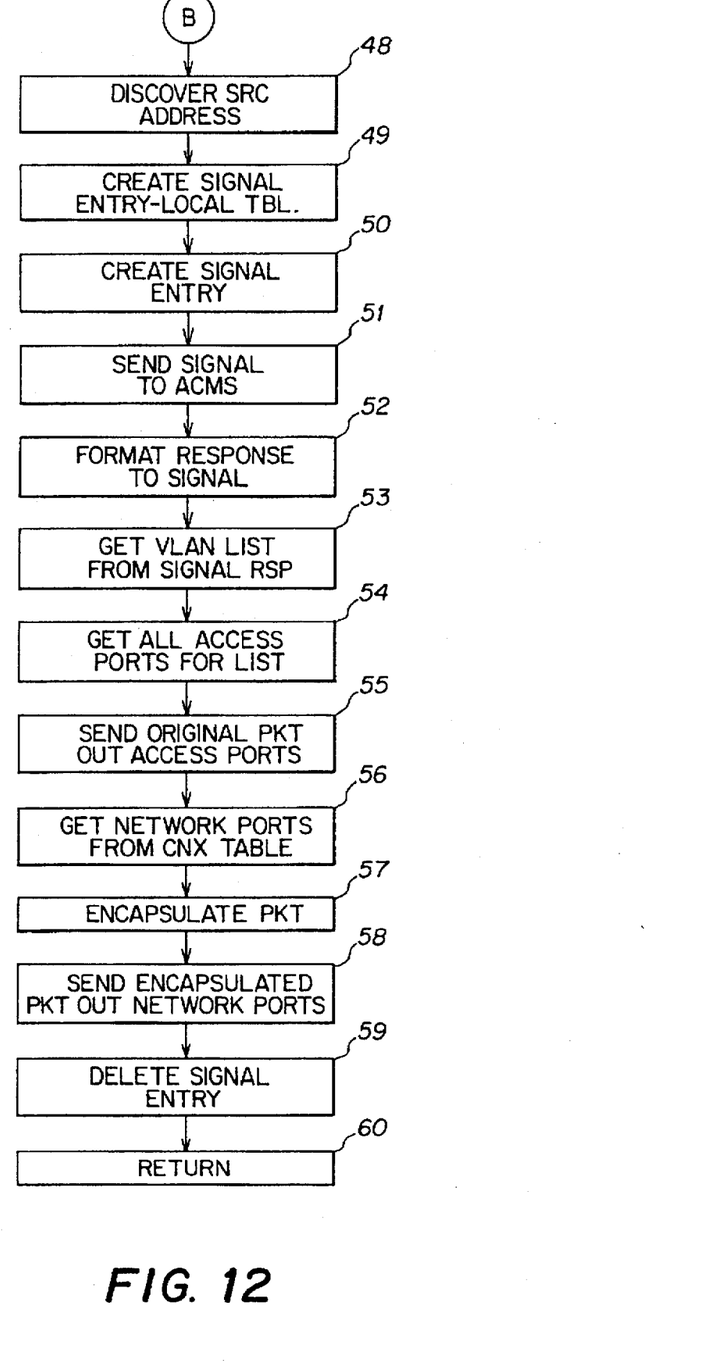
FIG. 12 is a flow chart showing the call processing performed by the VBUS service.

FIG. 12 illustrates the operation of the VBUS call processor. Each switch listens for source addresses heard on each access port (step 48). The call processor then updates the End System/VLAN table with the access port and end systems heard (step 49). The call processor then creates a signal entry (step 50) which is sent to the connection server (step 51), which formats a response to the signal (step 52). The connection server returns a signal with the associated VLAN list, which is received by the call processor (step 53). The call processor gets the associated access ports from the VLAN/Access Port Table (step 54) and sends out the original packet on the associated access ports (step 55). The call processor gets the network ports from the switch's connection table (step 56), encapsulates the packet with the VLAN header (step 57), and sends the encapsulated packet out the network ports to the other switches (step 58). The call processor then deletes the signal entry (step 59) and returns to start (step 60).

Figure 13:
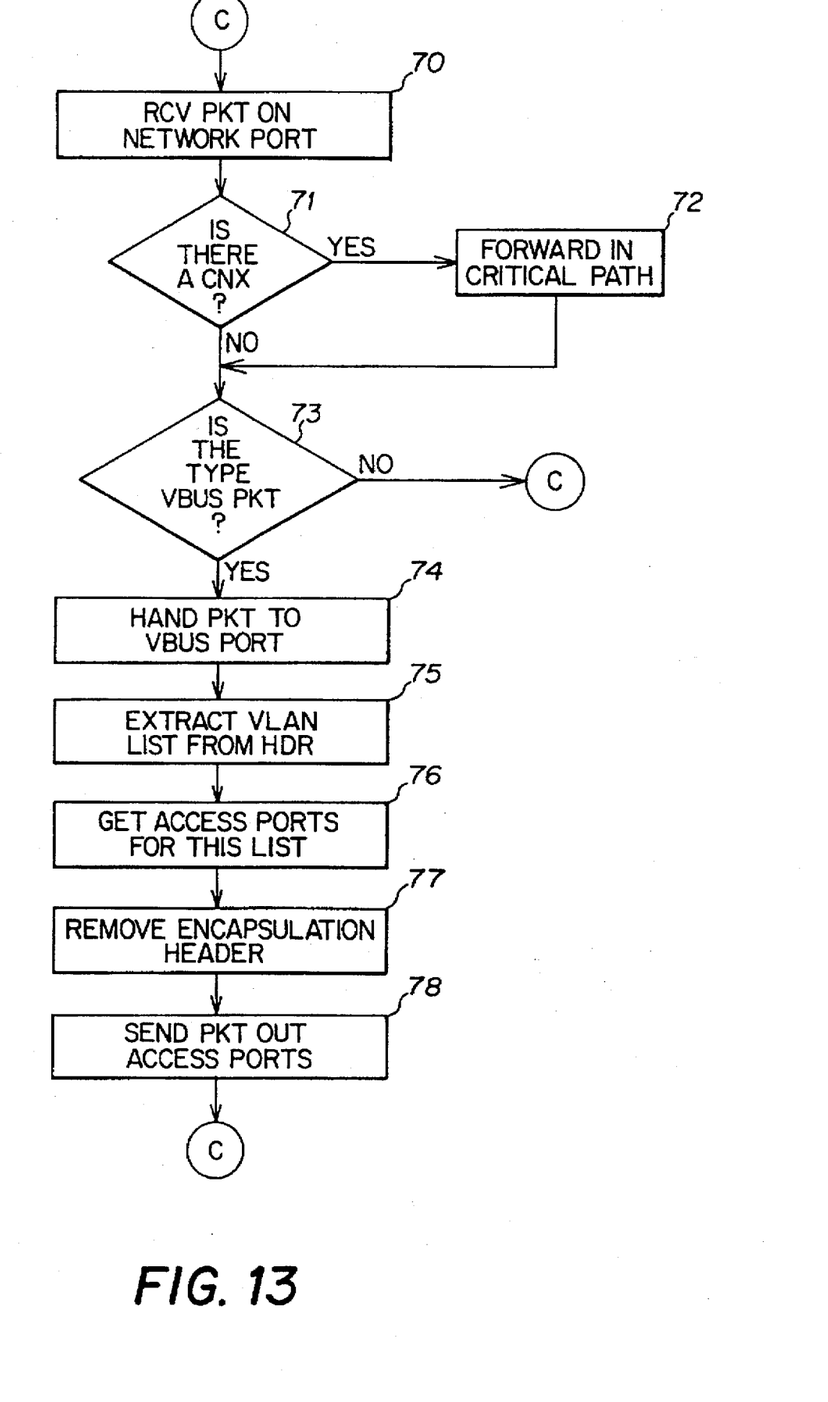
FIG. 13 is a flow chart showing the channel listening process of the VBUS service.

FIG. 13 illustrates the operation of the VBUS channel listener. When a packet is received on a network port (step 70), it first determines whether there is a known connection in the connection database 82 (step 71), and if so, it forwards the packet out the appropriate outport (step 72). If there is no connection, it determines whether this is a VBUS packet (step 73). If no, it returns to the beginning. If it is a VBUS packet, the packet is handed to a VBUS port (step 74) and the VLAN list is extracted from the header (step 75). The access ports are obtained from the VLAN/Access Port Table (step 76), and the encapsulation header removed from the packet (step 77). The original packet is then sent out the associated access ports defined in the table (step 78).

In one embodiment, the switch provides a MIB interface to allow an external application to assign VLAN-IDs to access ports and/or end systems. The simplest model is to progam VLAN-IDs to the switched ports only; under this model, the administration is simpler and the VLAN assignment to end systems is implied by the switched port to which the end systems are physically connected. A more robust model would map the VLAN-IDs from policy work group definitions.

The application interface may be provided with an SNMP (Simple Network Management Protocol) MIB (management information base) which allows a simple interface to program connections via a single SNMP set message. The MIB interface provides the following semantics:

(map, unmap) [SFPS VLAN-ID] [inPort] [userMAC]

This verb set assigns (and removes) a user MAC address and switch port to (or from) a specific VLAN.

(map-port, unmap-port) [SFPS VLAN-ID] [inPort]

This verb set assigns (and removes) a switch port to (or from) a specific VLAN. The switches provide managed objects accessible by the MIB which are all accessed with standard SNMP get, get next, and set messages.

In one embodiment, a VLAN status table is provided. This table allows an entire VLAN to be enable or disabled regardless of the number of user or switch ports assigned to the VLAN in the switch. Thus, it is possible to shut off a particular VLAN inside a particular switch without having to administer each individual switch port or end system.

One goal of the VBUS service is to require minimal support from the network server. The only server requirement is providing each switch with a connection to all other switches in the network (domain), which in effect provides the multicast channel for flooding VLAN packets.

While there have been shown and described several embodiments of the present invention, it will be obvious to those skilled in the art that various changes and modifications may be made therein without departing from the scope of the invention as defined by the appending claims.

We claim:

1. A method of forwarding broadcast data packets in a switched data communications network, the network including a plurality of end systems and switches connected by links, the switches having access ports connected to end systems and network ports connected to other switches, and each end system having a unique physical address, the method comprising the steps of:
   a. assigning different virtual LAN identifiers (VLAN-IDs) to different subsets of associated end systems or access ports;
   b. maintaining a first table for mapping the VLAN-IDs to the associated end systems or access ports;
   c. maintaining a second table for mapping the access ports to the associated VLAN-IDs;
   d. when a broadcast packet is received from a source end system at a receiving access port of a first switch:
      i) reviewing the first table for one or more VLAN-IDs associated with the source end system or receiving access port;
      ii) encapsulating the packet by adding a header with the associated VLAN-IDs;
      iii) forwarding the encapsulated packet to all other switches in the network;
      iv) reviewing the second table for the access ports on the first switch associated with the associated VLAN-IDs and forwarding the broadcast packet out the associated access ports; and
   e. when the encapsulated packet is received at a next switch:
      i) stripping the header from the encapsulated packet and determining the associated VLAN-IDs;
      ii) reviewing the second table for the access ports associated with the associated VLAN-IDs; and
      iii) forwarding the broadcast packet out the associated access ports.

2. The method of claim 1, wherein steps a–c include:
maintaining a common registry of assigned VLAN-IDs; and
maintaining the first and second tables at each switch.

3. The method of claim 2, wherein steps a–c include:
registering each end system with the common registry, and returning a list of assigned VLAN-IDs from the common registry to each switch.

4. The method of claim 2, wherein steps a–c include:
providing common management of the first and second tables at each switch.

5. The method of claim 2, wherein steps a–c include:
sending a signal from the first switch to the common registry to resolve an end system to its assigned VLAN-IDs.

6. The method of claim 1, wherein steps a–c include:
prior to assigning a VLAN-ID to a specific end system, maintaining a default VLAN-ID for that specific end system which maps to all access ports.

7. The method of claim 1, wherein step d includes:
maintaining a multicast channel of connections between all switches and sending the encapsulated packet on the multicast channel to all other switches in the network.

8. The method of claim 7, wherein step d includes:

maintaining a point-to-multipoint connection from each switch to all other switches in the network.

9. The method of claim 7, including:

providing a network server and maintaining a point-to-point connection between the server and each switch; and forwarding all broadcast packets received at the first switch to the network server, the network server performing steps b–d.

10. The method of claim 7, wherein each end system is registered with a common registry which programs the multi-cast channel.

11. The method of claim 1, wherein steps b–c include:

maintaining the first and second tables at each switch.

12. The method of claim 1, wherein step b includes:

listening to end systems heard on respective access ports at each switch and maintaining the end systems heard and their respective access ports in the first table at the respective switch.

13. The method of claim 1, further comprising:

assigning reserved VLAN-IDs without limitation as to end system and access port; and providing at least one switch which encapsulates the broadcast packet by adding a header with a reserved VLAN-ID, forwarding the encapsulated packet to all other switches, and forwarding the broadcast packet out the access ports on the at least one switch.

14. The method of claim 1, wherein step b further includes:

listening to end systems heard on respective access ports at each switch and maintaining the end systems heard and their respective access ports in the first table at the respective switch; and upon receipt of a unicast packet for a destination end system unknown to the first switch, completing steps d.i–iv) and e.i) and then at the next switch reviewing the first table for the respective access port for the destination end system and forwarding the packet out the respective access port.

15. The method of claim 1, wherein steps b–c include:

maintaining a Management Information Base (MIB) interface at each switch for programming the first and second tables.

16. The method of claim 15, wherein steps b–c include:

using a Simple Network Management Protocol (SNMP) set message for maintaining the first and second tables.

17. The method of claim 1, wherein steps b–c include:

maintaining a VLAN status table at each switch for enabling and disabling an entire VLAN-ID.

* * * * *

UNITED STATES PATENT AND TRADEMARK OFFICE
CERTIFICATE OF CORRECTION

PATENT NO. : 5,684,800
DATED : November 4, 1997
INVENTOR(S) : Dobbins et al.

Figure 4:
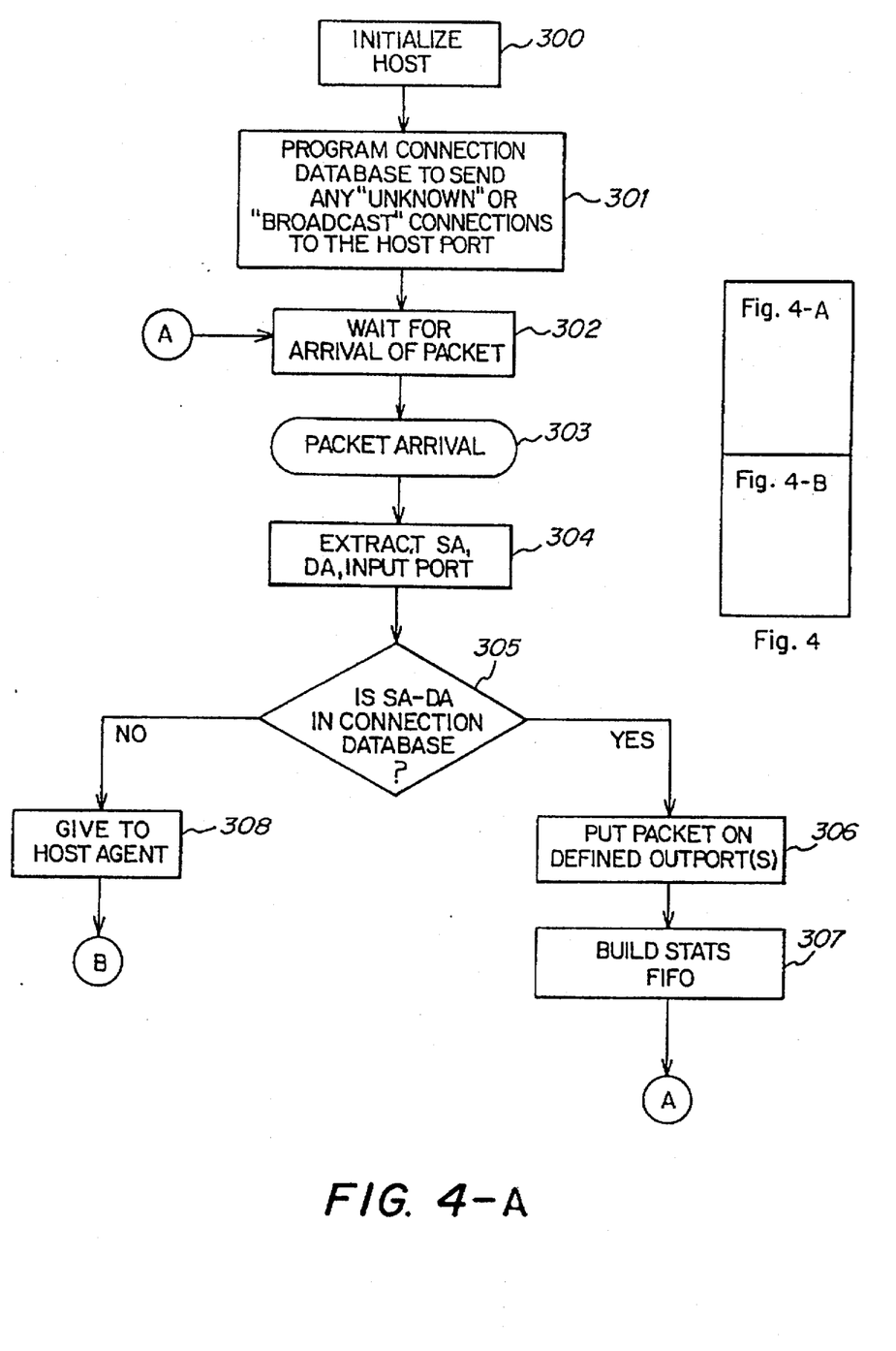

It is certified that error appears in the above-identified patent and that said Letters Patent is hereby corrected as shown below:

Col. 3, line 44 – delete "FIG. 4-1 and 4-2" and substitute -- FIG. 4, combining FIGS. 4-A and 4-B, --

Col. 4, line 66 – delete "4-1" and substitute -- 4-A --

Signed and Sealed this

Twenty-fifth Day of July, 2000

Q. TODD DICKINSON

Attest:

Attesting Officer

Director of Patents and Trademarks